United States Patent [19]

Levy

[11] Patent Number: 4,913,505

[45] Date of Patent: Apr. 3, 1990

[54] HOLLOW LIGHTPIPE AND METHOD FOR ITS MANUFACTURE

[76] Inventor: Michael B. Levy, 15018 NE. 177th Dr., Woodinville, Wash. 98072

[21] Appl. No.: 277,892

[22] Filed: Nov. 29, 1988

[51] Int. Cl.⁴ .......................... B29D 11/00; G02B 6/20
[52] U.S. Cl. ................................ 350/96.10; 350/96.32; 264/1.5
[58] Field of Search ............... 350/96.10, 96.30, 96.32, 350/96.34; 264/1.5, 173

[56] References Cited

U.S. PATENT DOCUMENTS

| | | | |
|---|---|---|---|
| 4,068,920 | 1/1978 | Bass et al. | 350/96.32 X |
| 4,652,083 | 3/1987 | Laakmann | 350/96.34 X |
| 4,688,892 | 7/1987 | Laakmann | 350/96.34 X |
| 4,688,893 | 7/1987 | Laakmann | 350/96.34 X |
| 4,805,987 | 2/1989 | Laakmann et al. | 350/96.34 X |
| 4,806,289 | 2/1989 | Laursen et al. | 350/96.34 X |

*Primary Examiner*—William L. Sikes
*Assistant Examiner*—Akm E. Ullah

[57] ABSTRACT

A light pipe is formed from an elongated substrate having a highly reflective coating formed on one surface thereof. The elongated ribbon is formed into a tubular structure, with a reflective inside surface. If desired, the elongated ribbon can be formed from a composite material having variable Young's modulus, thereby providing a neutral surface close to the reflective surface, thereby promoting adherence of the coating to the inner surface of the tubular structure. If desired, the longitudinal seam and the resulting tubular structure can be welded. In an alternative form of the hollow light pipe, the tubular structure can be placed inside a tubular housing which can be either formed in the appropriate dimensions or drawn down to the appropriate dimensions. The reflective layer can be formed by vacuum evaporation, chemical vapor deposition, anodizing, sputtering, flame spraying, among other methods.

35 Claims, 5 Drawing Sheets

HOLLOW LIGHTPIPE AND METHOD FOR ITS MANUFACTURE

TECHNICAL FIELD

This invention relates to lightpipes and a method for their manufacture, and more particularly, to hollow lightpipes manufactured by a linear process.

BACKGROUND OF THE INVENTION

The ability to transmit light through thin, flexible rods has many useful applications. In the visible light region of the optical light spectrum, this has been accomplished by low cost glass filament or plastic fibers. In the mid infra-red (IR) region of the spectrum, however, suitable fibers are difficult, if not impossible, to fabricate. Many workers have, therefore, focused their attention on hollow light guides, generally known as lightpipes.

The lightpipes should be flexible and ideally have a transmittivity greater than 90% per meter. Although, for some applications, the lightpipes may be as short as 1 inch, they should be manufacturable in lengths which exceed 1 meter and with an inner diameter of about 1 millimeter, and should be inexpensive, non-toxic, and easily manufactured. Lightpipes having such properties are suitable for numerous military, scientific, medical, and industrial applications.

A variety of approaches to the problem of developing such lightpipes have been taken, some meeting with limited success. There are several existing solid-type lightpipes relying on total internal reflection, but none of these has yet reached commercial realization. In the past, the methods of fabrication were capable of producing only relatively short lengths per manufacturing cycle, thus resulting in high cost per unit length. The hollow waveguide described by Katherine D. Laakmann in the U.S. Pat. No. 4,652,083 is available commercially, but suffers from limited flexibility and length. It is also more difficult than desired to manufacture because of the difficulty in depositing one or more thin film layers of precise thickness onto the interior wall of a long narrow lightpipe which may have an inside diameter of 1.0 to 1.5 millimeter.

In order for a hollow tube of approximately one meter length to transfer useful amounts of mid-IR radiation, it is necessary that the inner wall of the tube be coated with a reflection-enhancing material. This coating consists of one or more thin dielectric layers sometimes in combination with a thin layer of metal undercoating. Lightpipes having such coatings have been described in co-pending U.S. patent application Ser. No. 139,285, now U.S. Pat. No. 4,805,987 by Katherine D. Laakmann and Peter Laakmann, as well as U.S. Pat. Nos. 4,652,083, 4,688,892, and 4,688,893.

None of these coating methods, however, is conducive to depositing a coating directly on the inside of a long, narrow tube. It is therefore desirable to have an economical method of manufacturing hollow lightpipes having reflection-enhancing materials coated to their inner surfaces. In order to manufacture a low cost hollow lightpipe, it will be necessary to manufacture it via a continuous, linear process capable of producing hundreds of meters at a time. The resulting lightpipe should have the desirable characteristics noted above.

DISCLOSURE OF THE INVENTION

It is an object of the present invention to provide an efficient method for manufacturing a hollow lightpipe having a reflection-enhancing material coated to its inner surface.

It is another object of the present invention to provide a method for manufacturing a hollow lightpipe from an elongated ribbon of substrate material It is yet another object of the present invention to provide a method for manufacturing a hollow lightpipe including applying a coating of reflection enhancing material to one surface of an elongated ribbon of substrate material prior to forming an elongated tube from the coated substrate.

Still another object of the present invention is to provide a method for manufacturing a hollow lightpipe from a very thin layer of substrate material, the substrate material being held in a tubular form by being placed within a surrounding tubular sleeve.

Yet other objects of the present invention are to provide hollow lightpipes made according to the above described methods.

According to one aspect, the present invention provides a method of making a waveguide for high efficiency transmission of laser light having a desired wavelength. The method comprises the steps of (a) providing an elongated ribbon of a substrate material, the ribbon having first and second opposite longitudinal edges spaced apart by a substantially uniform width and first and second sides therebetween, (b) forming a reflective coating on the first side, and (c) after forming the reflective coating, then bending the ribbon to position the first and second edges together to form a hollow tube, with the first side forming an interior surface of the tube.

In another aspect, the invention provides a waveguide for high efficiency transmission of laser light. The waveguide is made by the process of forming an elongated ribbon of a substrate material, the ribbon having first and second opposite longitudinal edges and first and second sides therebetween, forming a reflective coating on the first side, and bending the ribbon to position the first and second edges together to form a hollow tube, the first side forming an inner surface inside the tube.

In still another aspect, the invention is a waveguide for high efficiency transmission of laser light. The waveguide comprises a hollow elongated tube made from an elongated bent ribbon having a longitudinal seam and an interior surface defining an elongated interior space through which the laser light is transmitted. The waveguide further comprises a reflective layer formed on the interior surface of the tube for reflecting the laser light incident thereon. In one embodiment the waveguide can comprise a hollow elongated bendable metal tube.

BEST MODES FOR CARRYING OUT THE INVENTION

Figure 1:
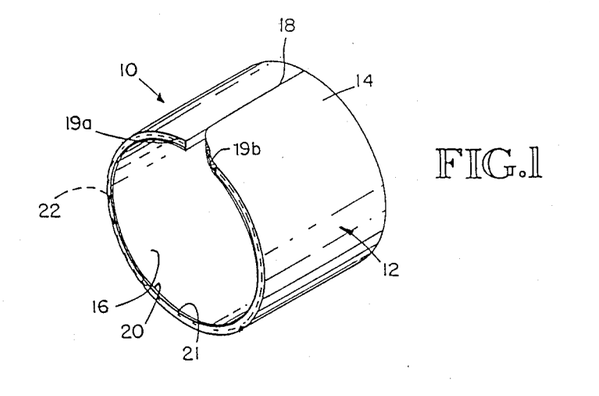
FIG. 1 is a fragmentary, perspective view of a first embodiment of the lightpipe of the present invention, showing a transverse cross section.

FIG. 1 is an isometric drawing of a first embodiment of a hollow lightpipe 10 made according to the method of the present invention. The hollow lightpipe 10 is made from a narrow, elongated flat foil or ribbon 11 (shown as such in the step of the manufacturing method illustrated in FIG. 6) of a substrate material that has been formed into a cylindrical or tubular substrate structure 12 having an exterior surface 14 and an interior surface 16. The tubular substrate structure 12 can have any convenient cross-section, including circular and polygonal cross-sections. In one preferred embodiment, the elongated ribbon 11 has a thickness of about 0.003 inch or less. The tubular substrate structure 12 includes a longitudinal seam 18 formed from an abutting arrangement of the opposite longitudinal edges 19a and 19b of the elongated ribbon 11 which are welded together.

The interior surface 16 is highly reflective. In general, the surface 16 must be coated with a reflective coating to form a reflective layer or surface 20 composed of a coating material having enhanced light reflective properties. The reflective coating can be a material with a refractive index having a low real part or a metal with a dielectric overcoat to enhance reflectivity. Classes of such materials are described in the above mentioned patent application by Katherine D. Laakmann and Peter Laakmann, as well as U.S. Pat. Nos. 4,652,083, 4,688,892, and 4,688,893. In accordance with the inventive method, the coating material is first applied to the elongated ribbon 11 to form the reflective layer 20 and then the elongated ribbon is transversely bent or curled to create the tubular substrate structure 12. If desired, a binder layer 21 can be applied to the interior surface 16 before the reflective layer 20 is formed thereon. The binder layer 21 improves the adhesion of the reflective layer 20 to the interior surface 16.

Figure 6:
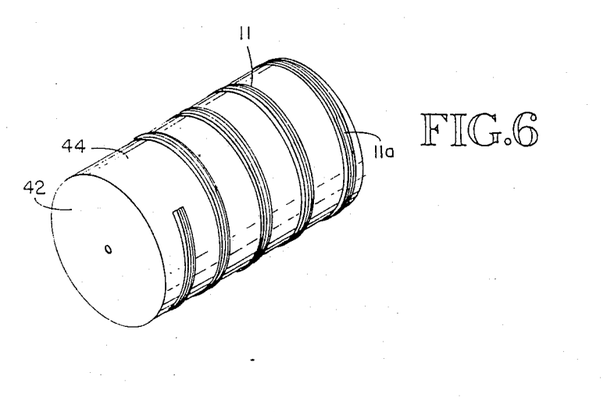
FIG. 6 is a schematic depiction of one step of a first method of the present invention.

In order to successfully manufacture the hollow lightpipe 10 with the tubular substrate structure 12 shown in FIG. 1, adhesion of the reflective layer 20 to the interior surface 16 of the tubular substrate structure 12 is of great importance, particularly since the reflective coating is generally applied on the elongated ribbon 11 while flat, before the ribbon is formed into the tubular shape by transversely curling it. For use with mid-IR region light, curling the coated ribbon 11 into a small diameter tube, with an inside diameter in the size range of from about 0.5 millimeter to 1.5 millimeter, places the reflective coating under considerable compressive forces. These forces tend to result in delamination of the reflective layer 20 from the elongated ribbon 11 of substrate material. Additional forces which tend to cause the reflective layer 20 to delaminate from the elongated ribbon result if the tubular substrate structure 12 is formed by passing the elongated ribbon through a conventional series of tube forming rollers such as shown in FIG. 6 and described below. Additional delaminating forces result from differential thermal expansion between the substrate material comprising the tubular substrate structure 12 and the reflective coating comprising the reflective layer 20.

Transversely curling the elongated ribbon 11 to form the tubular substrate structure 12 defines an imaginary, cylindrical neutral surface or axis, indicated by dashed line 22 in FIG. 1 contained within the tubular substrate structure 12. Along this neutral surface 22, there are no tensile or compressive forces. Portions of the tubular substrate structure 12 which are radially inward of the neutral surface are placed in compression while those portions of the tubular substrate structure 12 which are radially outward of the neutral surface are placed in tension. The compressive forces at a point located radially inside the neutral surface 22 increase the more the point is radially inward from the neutral surface 22. Therefore, the reflective layer 20 is placed under higher compressive forces than adjacent portions of the tubular substrate structure 12. The closer the reflective layer 20 is located to the neutral surface 22, the less compressive stress it realizes. In one preferred embodiment, the neutral surface 22 is less than 0.001 inch from the reflective layer 20.

The most direct way to minimize the distance the reflective layer 20 is located from the neutral surface 22 is to make the substrate material forming the elongated ribbon 11 quite thin, such as 0.0005-0.001 inch. If the elongated ribbon 11 has a thickness in this range it may be too fragile to withstand the process of being formed into the tubular substrate structure 12. As such, it may be appropriate to form the elongated ribbon from a laminated composite. Such a composite elongated ribbon 11 consists of a thin inner layer of material having a high Young's modulus bonded to a thicker outer layer of material having a much lower Young's modulus. The reflective layer 20 is applied to the thin inner layer having the high Young's modulus. Under these circumstances, when the elongated ribbon 11 is formed into the tubular substrate structure 12, the reflective layer 20 is positioned fairly close to the neutral surface 22 and the compressive stress is reduced. Also, the high Young's modulus of the thin inner layer lends springiness or resilience to the tubular structure 12. At the same time, the low modulus and greater thickness of the outer layer of the tubular substrate structure 12 provides structural integrity and allows the tubular substrate structure 12 to be welded along the longitudinal seam 18. Appropriate materials for a laminated composite are molybdenum for the thinner inner layer in a thickness of 0.0005 inch and tin for the thicker outer layer in a thickness of 0.003 inch. The outer material can also be chosen for its weldability.

Figures 2, 2A:
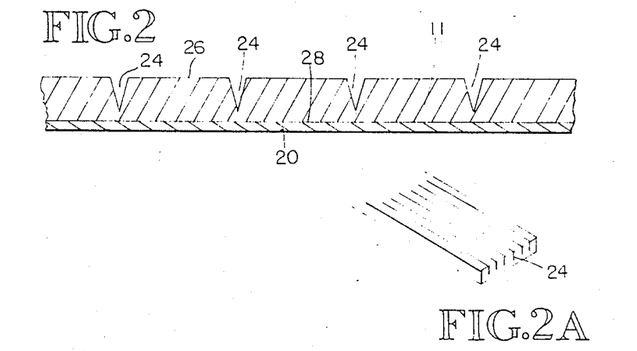
FIG. 2 is a transverse cross-sectional close-up view and FIG. 2A is a prospective view of a first embodiment of a longitudinally grooved ribbon, before it is bent transversely.
Figure 3:
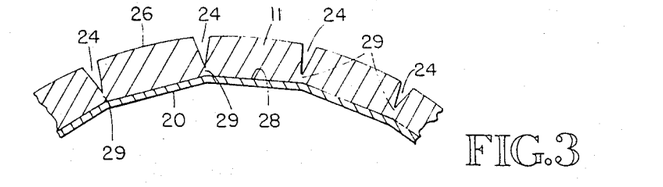
FIG. 3 is a transverse cross-sectional close-up view of the first embodiment of a longitudinally grooved ribbon shown in FIG. 2, after the ribbon has been bent transversely.

An alternative way of reducing the compressive stress in the reflective coating 20 is to form longitudinal grooves in the ribbon 11 before it is curled int its tubular form. This technique also mitigates any optical losses due to induced stress birefringence in the reflective coating 20. As shown in the transverse cross-sectional close-up view of FIG. 2 and the prospective views of FIG. 2A, a plurality of longitudinal grooves 24 (for example, V-shaped grooves) are formed on the second side 26 of the ribbon 11. The reflective coating 20 is formed over the first side 28. The grooves 24 substantially reduce the stress in the reflective coating 20 when the ribbon 11 is curled into a longitudinally tubular shape, as shown in the transverse cross-sectional close-up view of FIG. 3. The reason is that all of the bending occurs at the grooves 24 along bending lines 29, sparing the reflective coating 20 from the compressive forces of the curling process. The reflective coating 20 can be applied to the first side 28 either before or after the grooves 24 are formed in the ribbon 11 but before the ribbon 11 is curled into its longitudinally tubular shape.

Figure 4:
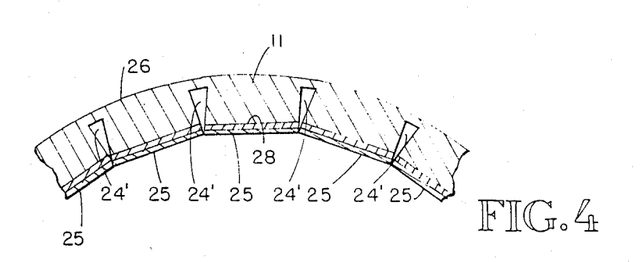
FIG. 4 is a transverse cross-sectional close-up view of a second embodiment of a longitudinally grooved ribbon, after the ribbon has been bent transversely.

The polygonal form of the tube which results from the grooving techniques described above offers no practical performance disadvantage as compared to a cylindrical waveguide. If the reflective coating 20 tends to delaminate along the bending lines 29, and the width of the delamination zone is intolerably wide, then the ribbon 11 can be longitudinally grooved as shown in FIG. 4. FIG. 4 shows the grooved ribbon 11 after it has been transversely curled to produce the hollow lightpipe 10. In this case, the grooves 24' (preferably having parallel sides and square bottoms when formed) are formed either before or after the reflective coating 20 is applied to the first side 28. If, as shown in FIG. 4, the grooves 24' are formed in the first side 28 after the reflective coating 20 is applied, resulting separate segments of the reflective coating 20 close up tightly in a butting relationship when the ribbon 11 is transversely curled. Alternatively, the reflective coating 20 can be formed after the grooves 24' are formed in the first side 28 of the ribbon. If desired, a low-loss thin film dielectric coating 25 can be formed over the reflective coating 20.

Another method of forming a composite elongated ribbon is to simultaneously roll a thin coated ribbon with a thicker ribbon placed therebelow to produce a thin-walled tube within a thick-walled tube. As the tubes exit the forming rollers the outer thickwalled tube is welded in place around the inner thinwalled tube. This creates a reflective coating residing on a very thin substrate with low compressive stress, with the thin-walled tube encased within a more mechanically robust thick-walled tube. The methods described above tend to isolate the reflective layer 20 from the weld heat. As described above, the materials composing the two tubes can also be selected separately, to optimize the weldability of the thick-walled tube, for example.

Other properties of the elongated ribbon 11 that will affect the reflective coating adhesion, overall durability, and/or manufacturability of the hollow lightpipe 10 are: thermal conductivity, melting point, and coefficient of thermal expansion. The substrate material of the tubular substrate structure 12 adjacent to the reflective layer 20 should have good thermal conductivity for efficient heat dissipation, a high melting point to resist the effects of heating by a beam of laser light, and a coefficient of thermal expansion to optimize adhesion of the reflective coating comprising the reflective layer 20. The hollow lightpipe 10 will be subjected to elevated temperatures during the process of forming the reflective layer 20, during any welding process used, and to a lesser extent, during use. In one preferred embodiment, the coating material that is selected for the reflective layer 20 will not melt at incident flux levels of 5000 watts per square centimeter at angles of incidence of greater than 75 degrees. In this embodiment, the lightpipe 10 can withstand at least 50 W of laser power with or without an enhanced reflective coating 20.

Differential thermal expansion between the reflective layer 20 and the substrate material comprising the tubular substrate structure 12 will produce stresses. Since the reflective coating comprising the reflective layer 20 will consist of a number of thin layers, the effects of thermal expansion can only be partially mitigated. When using a composite structure as described previously, the thick outer layer/tube should have a somewhat lower melting point and thermal conductivity than the thin inner layer/tube in order to enhance its weldability. Also, since great differences exist among the optical coating materials and their ability to handle tensile and compressive forces, the substrate material comprising the tubular substrate structure 12 and the reflective coating comprising the reflective layer 20 should be chosen not only for their desired optical properties, but also for their thermal and mechanical properties.

Some relief from these undesired stresses within the structure of the hollow lightpipe 10 can be had by fabricating the hollow lightpipe 10 to have somewhat larger inside diameter, such as in the size range of from 1.0 millimeter to 1.5 millimeter. While this is a practical solution since the reflective material 20 is not curled so tightly when the tubular substrate structure 12 is formed, it may only be used within certain limits, since beyond a certain size the hollow lightpipe 10 may not be usable for its intended purpose. The preferred range of outside diameters for the tubular substrate structure 12 is from 0.5 to 2.0 millimeters.

Appropriate substrate materials for the tubular substrate structure 12 are molybdenum, beryllium copper, stainless steel, and aluminum. Reflective coatings of two types may be used. One type of reflective coating is described in the above-mentioned patent application by Katherine D. Laakmann and Peter Laakmann. It is particularly desirable that the material forming the reflective layer 20 have a refractive index with a real part less than 0.2, in which event, the reflective layer 20 is especially suitable for use with a NdYAG laser, particularly when the reflective layer is made from a metal, such as silver or copper. Other types of reflective coatings are a high reflectivity metal coating with a dielectric overcoat to enhance reflectivity, as described in the abovementioned patent and patent application. Other materials appropriate for the reflective layer 20 are $As_2S_3$, $PbF_2$, $ZnSe$, $ZnS$, and $ThF_4$.

Figure 5:
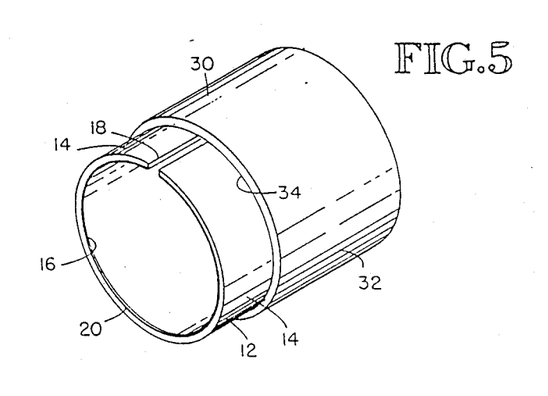
FIG. 5 is a perspective view of a second embodiment of the lightpipe of the present invention, showing a transverse cross section.

Referring now to the perspective view of FIG. 5, an alternative structure for the hollow lightpipe 10 is shown wherein it is not necessary to weld the longitudinal seam 1. In the hollow lightpipe 10 of FIG. 5, the tubular substrate structure 12 is contained within an outer sleeve 30 having an outer sleeve surface 32 and inner sleeve surface 34. The exterior surface 14 of tubular substrate structure 12 fits in close proximity to the inner sleeve surface 34 of the sleeve 30 and holds the opposite longitudinal edges 19a and 19b of the elongated ribbon 11 without welding.

Figure 9A:
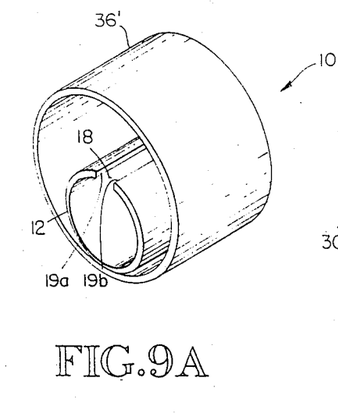
FIG. 9A is an isometric drawing of another step of a second method of the present invention.
Figure 9B:
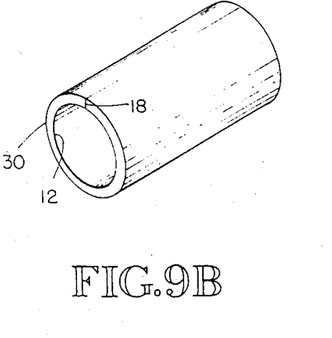
FIG. 9B is an isometric drawing of a further step according to a second method of the present invention.

The hollow lightpipe 10 of FIG. 5 can be manufactured in a number of ways using a continuous linear process. As shown in FIG. 9A, one way is to place appropriate lengths of the tubular substrate structure 12 (e.g., a one meter length) in a larger diameter sleeve 30' made of a material which can then be drawn down to a smaller diameter to form the sleeve 30. Suitable materials are stainless steel and beryllium copper. After the tubular structure 12 is loosely in place within the large sleeve 30', the sleeve is drawn down until it forms the sleeve 30 and fits snugly around the tubular substrate structure 12 as shown in FIG. 9B. In this manner, the longitudinal edges 19a and 19b of the tubular substrate structure 12 are drawn into contact and held there without the need for welding or the application of the intense heat associated with welding.

The hollow lightpipe 10 shown in FIG. 5 can also be manufactured by first transversely curling the tubular substrate structure 12 so that it has a diameter smaller than that of the sleeve 30, then placing the tightly curled tubular substrate structure 12 into the sleeve 30, and allowing the tubular substrate structure 12 to relax and uncurl until its exterior surface 14 is in close proximity to the inner sleeve surface 34 of sleeve 30.

Figure 10:
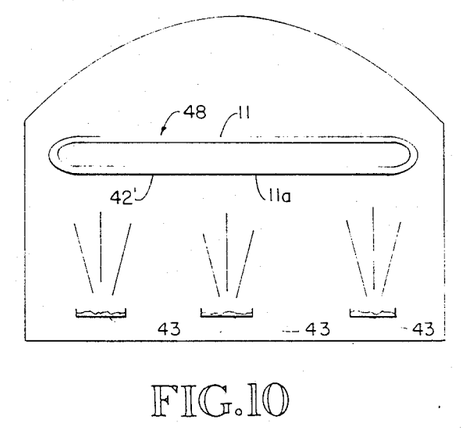
FIG. 10 is a schematic depiction a step in a third method of the present invention.

As mentioned above, it is necessary that the reflective layer 20 be applied on the elongated ribbon 11 before the elongated ribbon is transversely curled into the shape of the tubular substrate structure 12. One step in a method for accomplishing this is shown in FIG. 6. It consists of longitudinally winding the elongated ribbon 11 in a helical wind onto a cylindrical drum 42 with a smooth outer surface and having a diameter much greater than the thickness of the elongated ribbon 11. In this way, a first surface (not shown) of the elongated ribbon 11 which ultimately becomes the exterior surface 14 of the tubular substrate structure 12 is placed against an exterior surface 44 of the drum 42, while a second surface 11a of the elongated ribbon which ultimately becomes the interior surface 16 is facing outwardly. By providing the drum 42 with a diameter and axial length which are relatively large compared to the thickness and width of the elongated ribbon 11, long lengths of the elongated ribbon 11 can be wound onto the exterior surface 44 of even a moderately sized drum by turning the drum about an axis (not shown). The drum 42 can have a circular cross-section, as shown in FIG. 8, or an oval cross-section, as shown in FIG. 10.

Figure 7:
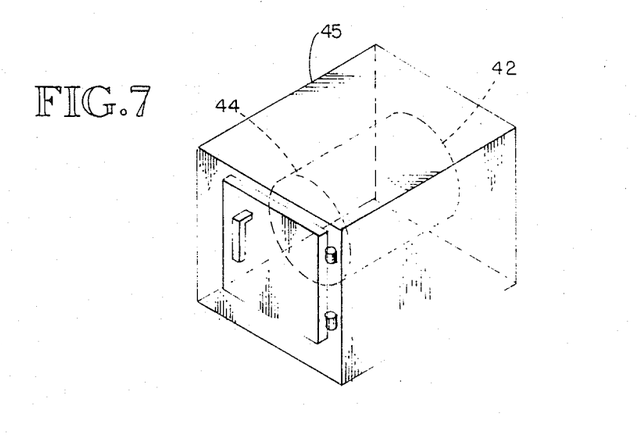
FIG. 7 is a schematic depiction of another step of the first method of the present invention.

Once the elongated ribbon 11 is wound onto the drum 42, the reflective layer 20 is applied on the elongated ribbon 11. As shown in FIG. 7, the drum 42, with the elongated ribbon 11 wound around its exterior surface 44, is placed in a coating chamber 45 of conventional type. A conventional process such as chemical vapor deposition, vacuum evaporation, sputtering, or flame spraying can be used to apply a thin film of reflective coating to the substrate material. In some processes, such as vacuum evaporation, it is important that the vapor stream of the material being deposited to form the reflective layer 20 strike the exposed second surface 11a of the elongated ribbon 11 at an approximately 90 degree angle. One means to accomplish this purpose is shown in FIG. 10, where the elongated ribbon 11 is formed around a drum 42' having a flattened or oval cross-section. In this way, the outwardly facing second surfaces 11a of the elongated ribbon 11 wound on a first half 46 of the drum 42 can first be coated using a vapor stream generated from coating material 43 positioned therebelow and, subsequently, the drum can be rotated and the outwardly facing second surfaces 11a of the elongated ribbon wound on a second half 48 of the drum 42 can be coated.

Figure 11:
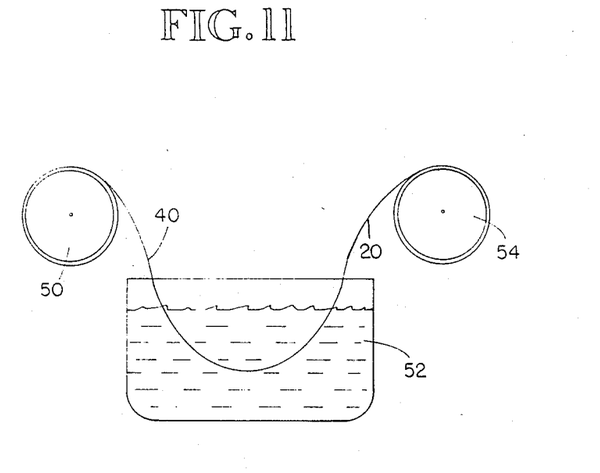
FIG. 11 is a schematic depiction of a step in a fourth method of the present invention.

An alternative method for continuously applying the reflective layer 20 on the elongated ribbon 11 is shown in FIG. 11. An uncoated elongated ribbon 11 wound on a supply spool 50, is unwound and passed through an anodizing bath 52. The elongated ribbon 11 with the reflective layer 20 anodized is then wound to a takeup spool 54. In one preferred embodiment, the reflective layer 20 anodized onto the elongated ribbon 11 is anodized for enhanced reflectivity coating at wavelengths of about 10.6 nanometers.

Figure 8:
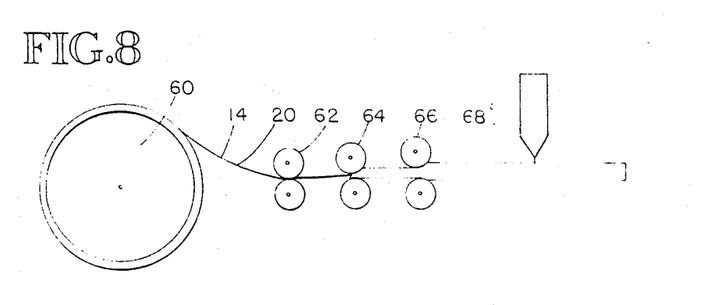
FIG. 8 is a schematic depiction of yet another step of the first method of the present invention.

The schematic diagram of FIG. 8 shows the formation of the tubular substrate structure 12 from the elongated ribbon 11, after elongated ribbon has had the reflective layer 20 applied thereon by one of the aforementioned processes. After the elongated ribbon 11 has been coated with the reflective layer 20, it is wound onto a supply drum 60. Of course, if the reflective layer 20 has been formed on the elongated ribbon 11 using the drum 42 of FIG. 7 or the spool 50 of FIG. 11, this drum or spool can serve as the supply drum 60. The coated elongated ribbon is passed through a series of rollers 62, 64 and 66 which cause the elongated ribbon to transversely curl to form the tubular structure 12. If desired, the longitudinal seam 18 can be welded by a welding tool 68. Using the method shown in FIG. 8, it is possible to fabricate the hollow lightpipe 20 via a continuous linear process capable of producing hundreds of meters of hollow lightpipe at a time. This is particularly appropriate for the formation of hollow lightpipes and other tubular structures requiring an inner, applied layer, since standard tube-forming rolling apparatus require substantial lengths (i.e., 50 meters or more) of ribbon length just to bring the apparatus in proper adjustment. Accordingly, since the hollow lightpipe 10 is typically used in approximately 1 meter lengths, the cost of a manufacturing run can be apportioned among a hundred or more lengths.

While several forms of the preferred embodiments of the hollow lightpipe of the invention and its inventive method of manufacture have been described in the foregoing, it will be understood by those skilled in the art that many modifications to the described process can be used without departing from the spirit and scope of the invention. Accordingly, the spirit and scope of the invention is to be limited only by the following claims:

I claim:

1. A waveguide for high efficiency transmission of laser light made by the process of forming an elongated ribbon of a substrate material, said ribbon having first and second opposite longitudinal edges and first and second sides therebetween, forming a reflective coating on said first side, and then bending said ribbon to position said first and second edges together to form a hollow tube with said first side forming an inner surface inside said tube.

2. The waveguide of claim 1, made further by next positioning said bent ribbon in a longitudinal sleeve with an inside surface of said longitudinal sleeve engaging said second side of said bent ribbon to hold said first and second ribbon longitudinal edges together.

3. The waveguide of claim 2, made further by the process of drawing down said longitudinal sleeve to form a closely-fitting enclosure around said bent ribbon.

4. The waveguide of claim 1, made further by forming a plurality of longitudinal grooves in said first or second side of said ribbon prior to bending said ribbon.

5. A waveguide for high efficiency transmission of laser light, comprising:

a hollow elongated tube made from an elongated ribbon of a substrate material, said ribbon having opposite longitudinal edges and being transversely bent to place said opposite edges in edge-to-edge relation to define a seam, said tube also having an interior surface defining an elongated interior space through which the laser light is transmitted; and a reflective layer formed on said interior surface of said tube for reflecting the laser light incident thereon.

6. The waveguide of claim 5 wherein said seam is welded.

7. The waveguide of claim 5 wherein said reflective layer is a vacuum-deposited thin film coating.

8. The waveguide of claim 5 wherein said reflective layer includes a high reflectivity metal and a dielectric overcoat having one or more layers formed over said reflective layer.

9. The waveguide of claim 8, wherein said dielectric overcoat has a thickness which is approximately one-eighth of said wavelength of said light incident on said reflective layer.

10. The waveguide of claim 9, wherein said dielectric overcoat is formed from one of a group of materials comprising $As_2S_3$, $PbF_2$, $ZnSe$, $ZnS$, and $ThF_4$.

11. The waveguide of claim 5 wherein said tube has an exterior surface, the waveguide further comprising a housing having a first transverse cross section and surrounding said tube in proximity to said exterior surface.

12. The waveguide of claim 11, wherein said housing is a longitudinal sleeve engaging said exterior surface to hold said opposite edges in said edge-to-edge relation.

13. The waveguide of claim 11 wherein said housing has been drawn down to said first transverse cross section from a second transverse cross section larger than said first transverse cross section.

14. The waveguide of claim 5 wherein said tube is made from a foil having a thickness of less than about 0.003 inch.

15. The waveguide of claim 5 wherein said tube is made from a material having a neutral surface which is less than approximately 0.001 inch from said reflective layer.

16. The waveguide of claim 5 wherein said interior surface has a transverse cross section which is substantially circular.

17. The waveguide of claim 5 wherein said ribbon comprises a metal and said reflective layer consists of a dielectric overcoat on said metal to enhance reflectivity.

18. The waveguide of claim 17 wherein said metal is selected from a group comprising molybdenum, beryllium copper, and stainless steel.

19. The waveguide of claim 5 wherein said reflective layer of material has a complex index of refractivity with a real part (n) less than about 0.2.

20. A method of making a waveguide for high efficiency transmission of laser light having a desired wavelength, comprising the steps of:
(a) providing an elongated ribbon of a substrate material, said ribbon having first and second opposite longitudinal edges spaced apart by a substantially uniform width and first and second sides therebetween;
(b) forming a reflective surface on said first side; and
(c) after forming said reflective surface, then bending said ribbon to position said first and second edges together to form a hollow tube, with said first side forming an interior surface of said tube.

21. The method of claim 20 further comprising the steps of:
(d) providing a longitudinal sleeve; and
(e) after bending said ribbon, positioning said bent ribbon in said longitudinal sleeve with an inside surface of said longitudinal sleeve engaging said second side of said bent ribbon to hold said first and second ribbon longitudinal edges together.

22. The method of claim 21, wherein said longitudinal sleeve initially has an interior diameter greater than an outer diameter of said bent ribbon, and the method further comprises the step of:
(f) after positioning said bent ribbon in said longitudinal sleeve, reducing the interior diameter of said longitudinal sleeve to form a closely-fitting enclosure around said ribbon.

23. The method of claim 22 wherein said interior diameter of said longitudinal sleeve is reduced by drawing down said longitudinal sleeve.

24. The method of claim 20 wherein the step of forming said reflective surface comprises the steps of:
providing a support means;
placing said second side of said ribbon against said support means; and
applying a reflective coating to said first side.

25. The method of claim 24 wherein said support means is a drum having an axis which is larger than said width of said ribbon and the step of applying said reflective coating further comprises the step of turning said drum about said axis, thereby winding said ribbon longitudinally around said drum, thereby exposing said first side of said ribbon outwardly from said drum.

26. The method of claim 25 wherein said drum has two flattened sides and the step of applying said reflective coating to said first side is accomplished by vacuum deposition from a vapor stream having a direction that is substantially perpendicular to said sides.

27. The method of claim 25 wherein said reflective surface is formed by a high-reflectivity metal and a dielectric overcoat from one of a group of materials comprising $As_2S_3$, $PbF_2$, $ZnSe$, $ZnS$, and $ThF_4$, and the step of applying said reflective surface to said first side further comprises the step of forming said reflective layer with a thickness of approximately one-eighth of said wavelength of light.

28. The method of claim 20 wherein said substrate material is made from molybdenum, beryllium copper, or stainless steel.

29. The method of claim 20 wherein said substrate material has a thickness that is less than about 0.003 inch.

30. The method of claim 20 wherein the step of forming said reflective surface comprises the steps of:
forming a binder coating on said first side; and
forming said reflective surface over said binder coating.

31. The method of claim 20 further comprising the step of:
(d) welding said first and second edges together.

32. The method of claim 20 wherein the step of forming said reflective surface is accomplished by anodizing said first side for enhanced reflectivity at optical wavelengths of approximately 10.4 micrometers.

33. The method of claim 20 further comprising the step of:

(d) after forming said reflective surface and prior to bending said ribbon, forming a plurality of longitudinal grooves in said first side of said ribbon, said grooves extending through said reflective surface and into said substrate material.

34. The method of claim 20 further comprising the step of:
   (d) after forming said reflective surface and prior to bending said ribbon, forming a plurality of longitudinal grooves in said second side of said ribbon, said grooves extending into said substrate material.

35. The method of claim 20 wherein the step of bending said ribbon comprises the steps of:
   providing a sleeve having a circular cross-section having a minimum inner diameter;
   rolling said ribbon into a tube with a diameter less than said minimum inner diameter of said sleeve;
   feeding said rolled elongated ribbon into said sleeve; and
   allowing said elongated ribbon to expand within said sleeve.

* * * * *

UNITED STATES PATENT AND TRADEMARK OFFICE
CERTIFICATE OF CORRECTION

PATENT NO. : 4,913,505
DATED : April 3, 1990
INVENTOR(S) : Michael B. Levy

It is certified that error appears in the above-identified patent and that said Letters Patent is hereby corrected as shown below:

In claim 15, column 9, line 41, delete "claim 5" and substitute therefor --claim 14--.

Signed and Sealed this

Ninth Day of July, 1991

Attest:

Attesting Officer

HARRY F. MANBECK, JR.

Commissioner of Patents and Trademarks